United States Patent
Burgess, Jr. et al.

(10) Patent No.: US 6,449,694 B1
(45) Date of Patent: Sep. 10, 2002

(54) LOW POWER CACHE OPERATION THROUGH THE USE OF PARTIAL TAG COMPARISON

(75) Inventors: Richard J. Burgess, Jr.; Mark A. Schaecher, both of Phoenix; Jay B. Miller, Chandler, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/362,919

(22) Filed: Jul. 27, 1999

(51) Int. Cl.[7] .............................................. G06F 12/00
(52) U.S. Cl. ...................................... 711/128; 711/118
(58) Field of Search ................................. 711/118, 128

(56) References Cited

U.S. PATENT DOCUMENTS

| | | | | |
|---|---|---|---|---|
| 4,483,003 A | * | 11/1984 | Beal ............................ | 714/805 |
| 5,479,641 A | * | 12/1995 | Nadir et al. ................. | 711/118 |
| 5,550,774 A | * | 8/1996 | Brauer et al. ........... | 365/189.02 |
| 5,553,276 A | * | 9/1996 | Dean ........................... | 395/550 |
| 5,555,529 A | * | 9/1996 | Hose et al. ............. | 365/230.03 |
| 5,920,888 A | * | 7/1999 | Shirotori et al. ............ | 711/128 |
| 6,122,696 A | * | 9/2000 | Brown et al. ................ | 710/127 |
| 6,131,140 A | * | 10/2000 | Rodgers et al. ............. | 711/104 |

* cited by examiner

Primary Examiner—Reba I. Elmore
(74) Attorney, Agent, or Firm—Blakely, Sokoloff, Taylor & Zafman LLP

(57) ABSTRACT

A method for conserving power during a cache memory operation is disclosed. The validity and the parity of the tag address are checked. If the tag is invalid or the parity bit does not check, the tag is not read and a tag comparison is not performed, such that the data is accessed from the main memory. Otherwise, the tag address bits are selected in a plurality of tag subsets. A first tag subset of the plurality of tag subsets is compared with a respective first subset of the tag field of the memory address bits. A first compare signal indicative of the result of the first comparison is outputted. The cache memory operation is interrupted if the first compare signal indicates the first tag subset does not match the respective first subset of the tag field of the memory address.

27 Claims, 5 Drawing Sheets

LOW POWER CACHE OPERATION THROUGH THE USE OF PARTIAL TAG COMPARISON

BACKGROUND OF THE INVENTION

1. Field of the Invention

This invention relates to the field of cache memory design, and more specifically, to a low power cache operation.

2. Background Information

A cache memory is a storage system incorporated either inside a central processor or between a processor and a main system memory. A cache memory stores instructions or data and it is able to supply this information to the processor faster than the main memory can. When a memory read operation is requested by the processor, the cache memory is checked to determine whether or not the data is present in the cache memory. If the cache contains the referenced data, the cache provides the data to the processor. Otherwise, the data is accessed from the main memory.

A cache memory uses a data array to store data and a tag array to store the tag addresses corresponding to the data. A main memory address consists of a tag field and an index field. The index field is used to index a specific tag address stored in the cache tag array. When a cache memory access is performed, the tag address stored in the cache tag array is read and it is then compared to the tag field of the main memory address. If the two tag addresses match, a cache "hit" has occurred and the corresponding data is read out to the processor. If the two tag addresses do not match, a cache "miss" has occurred and the data must be retrieved from the main memory.

Often, it is desirable to verify the integrity of the tag stored in the cache memory. Checking the validity and the parity of the tag address may be performed in order to assure that the tag is not corrupted or altered. In prior art methods, while the tag is compared, the valid bit and the parity bit of the tag address are verified. For example, FIG. 1 illustrates a prior art cache memory read operation. After receiving a memory address at box 100 and decoding a tag address from the cache tag array at box 110, the tag address, the parity bit, and the valid bit are read at box 120. At box 130, the tag, the parity bit, and the valid bit are then compared. If a "hit" has occurred, and the tag is determined to be valid, and the parity bit of the tag address matched the parity bit of the tag field of the main memory, then at box 140, the data is read from the cache memory. Otherwise, if either the valid bit or the parity bit does not match, or if a cache "miss" has occurred, then, at box 150, the cache memory operation is canceled.

It should be noted that for a set associative cache, the tag address, the parity, and the valid bit are read at box 120 for each way of the cache array. Similarly, at box 130, the tag, parity, and valid bits are compared for each way of the cache array. As such, if all comparisons for all ways result in a "miss", the data has to be accessed from the main memory. Otherwise, the way associated with the tag having a match is the way selected for conveying data bytes to the output of the cache.

The operation illustrated in FIG. 1 is, however, not suitable for a low power cache memory. Because the tag address is entirely read and compared while a validity or parity test is performed, a lot of power may be consumed before detecting an error.

Thus, it would be advantageous to provide a cache memory and a method for performing low power cache operations that minimize tag read and compare operations.

SUMMARY OF THE INVENTION

A method for conserving power during a cache memory operation is disclosed. A memory address comprising a tag field is received. A tag address within the cache memory is accessed. The tag address bits are selected in a plurality of tag subsets. A first tag subset of the plurality of tag subsets is compared with a respective first subset of the tag field of the memory address bits. A first compare signal indicative of the result of the first comparison is outputted. The cache memory operation is interrupted if the first compare signal indicates the first tag subset does not match the respective first subset of the tag field of the memory address.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which.

DETAILED DESCRIPTION

A method and apparatus for performing low power cache memory operations are disclosed. In the following description, numerous specific details are set forth such as logic and circuit configurations, memory read operation circuitry, etc. in order to provide a thorough understanding of the present invention. It will be obvious, however, to one skilled in the art that these specific details need not be employed to practice the present invention. In other instances, well-known materials or methods have not been described in detail in order to avoid unnecessarily obscuring the present invention.

Figure 1:
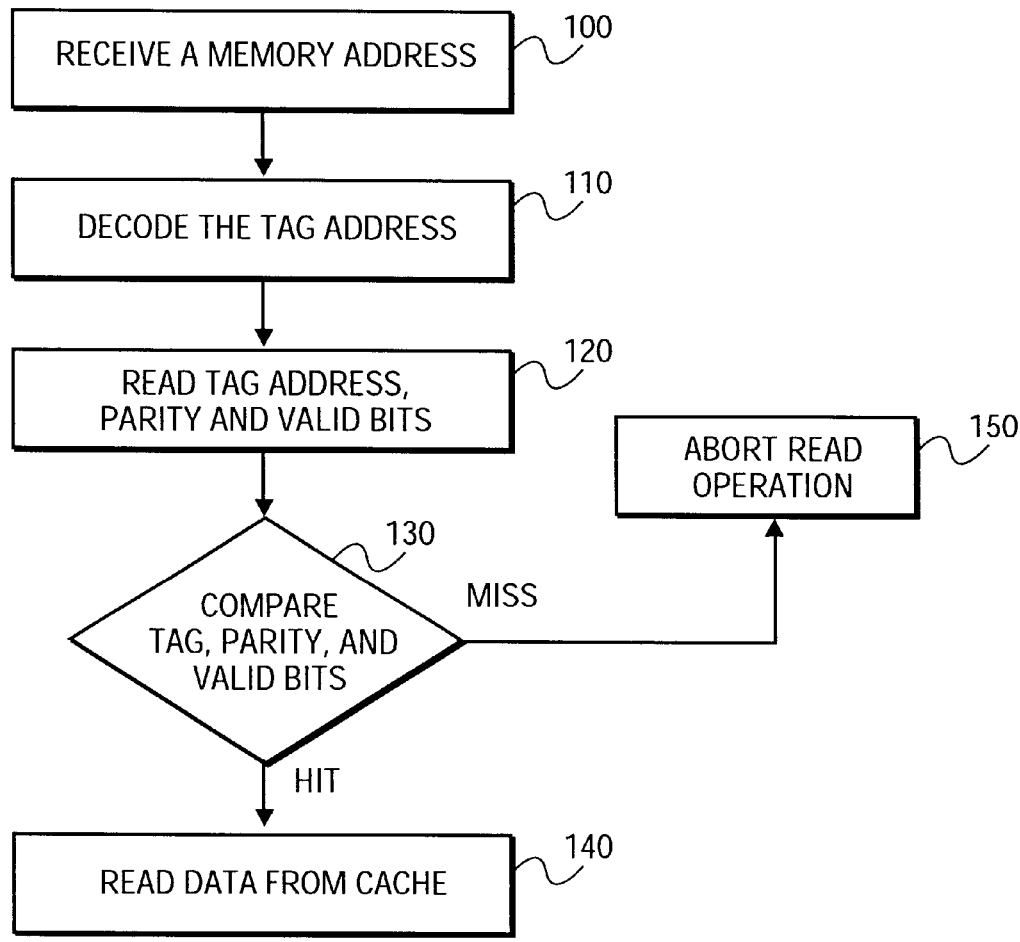
FIG. 1 is a flow chart illustrating a prior art cache memory read operation.
Figure 2:
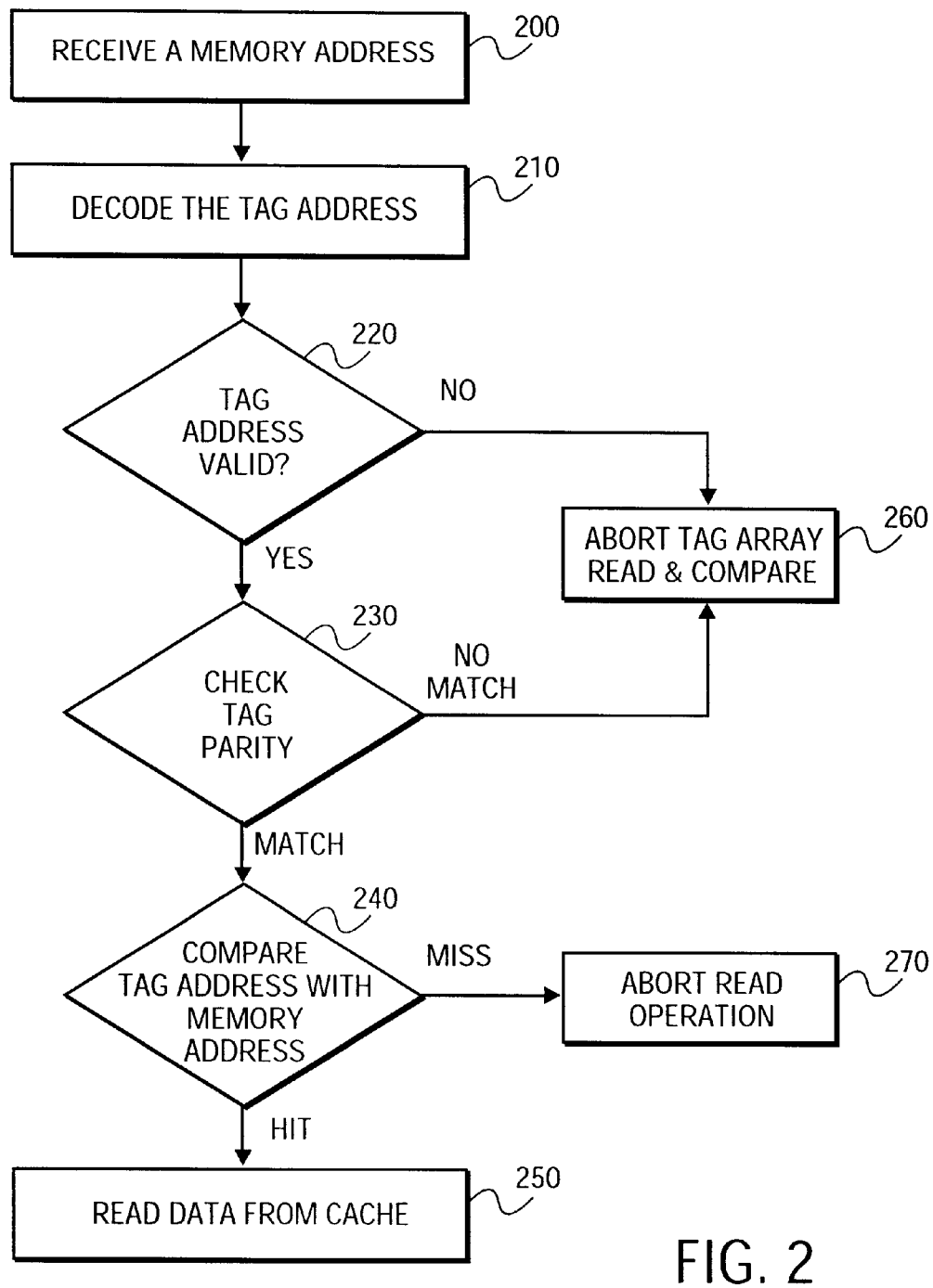
FIG. 2 is a flow chart illustrating a cache read operation according to one embodiment of the present invention.

FIG. 2 is a flow chart illustrating a cache memory read operation according to one embodiment of the present invention. At box 200, a memory address is received at the cache memory. Using the decoded index field of the memory address, at box 210, a tag address stored in the tag array is accessed. In order to detect a possible invalid tag, the valid bit is checked at box 220. If the tag is invalid, then the tag array read operation is canceled at box 260 and the tag address is not read. Thus, the tag address is not compared with the corresponding memory address.

If the tag is valid, at box 230, the parity of the tag address is compared with the parity of the tag field of the memory address. It will be appreciated that the parity check may be performed simultaneously with checking the validity of the tag address. It should be noted that the parity of the address may be represented by a single parity bit or a collection of parity bits. For example, the number of parity bits may match the number of words in the tag address.

If the parity of the stored tag address does not match the parity of the memory address, then the data is not in the cache and a main memory access is needed. As such, at box 260, the tag read and comparison operations are canceled.

According to the embodiment illustrated in FIG. 2, the tag address is read and then compared only if the tag is determined to be valid and if the parity of the tag address is checked. As such, a power consuming operation such as tag read or a tag compare is eliminated if an error is detected early during the cache memory read operation.

Continuing from box 230 of FIG. 2, if the tag is valid and if the parity checks, then the tag address stored in the tag array is read and then compared with the memory address. If a "miss" has occurred, then the cache read operation is canceled at box 270, and the main memory must be accessed to retrieve the data. Otherwise, if a "hit" has occurred, at box 250, the data is read from the data array.

Therefore, performing an early verification of the validity and parity of the tag address, prior to reading the tag address and comparing the tag address, power is saved in the cache memory.

Power dissipation during a cache read operation depends on a number of factors including: tag address size, hit rate, and number of tag bits read and compared. It should be noted that the smaller the number of tag bits that are read and compared, the less power is dissipated during a cache operation. As such, it is desirable in low power caches to read and compare a small number of tag address bits at a time. If a partial tag comparison is performed and a "miss" occurs, it would not be necessary to further perform subsequent read and comparison operations on the rest of the tag address bits. Therefore, once a "miss" is detected after reading and comparing only a first portion of the tag, the power, that otherwise would be dissipated while reading and comparing the rest of the tag address, is conserved.

Figure 3:
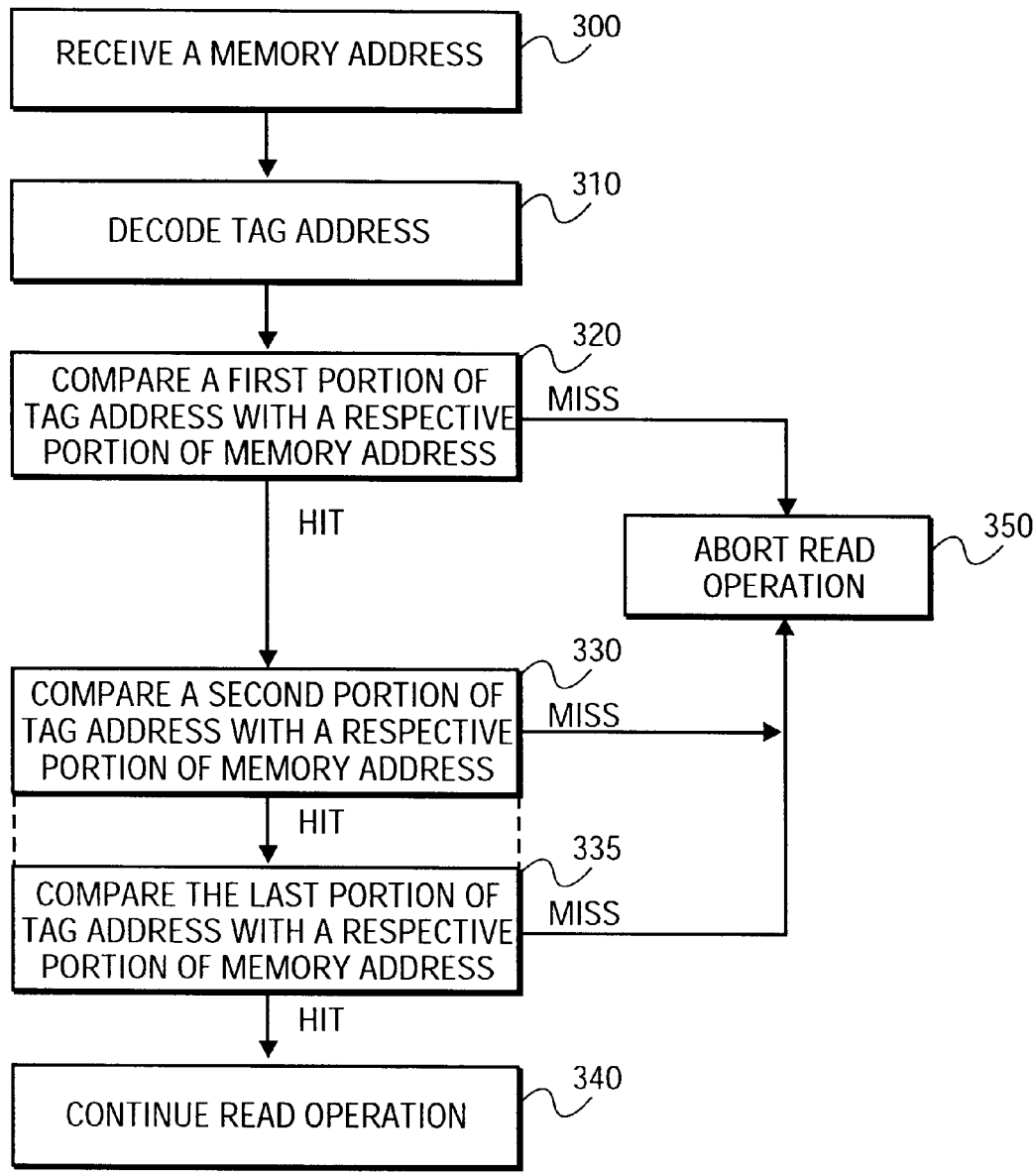
FIG. 3 is a flow chart illustrating a cache read operation according to another embodiment of the present invention.

As such, as illustrated in FIG. 3, power is further conserved in a second embodiment of the invention in which subsets of the tag address bits are serially read and compared, one at a time. After a memory address is received in the cache at box 300, a tag address stored in the tag array is decoded at box 310. Then, a first subset of the tag address stored in the tag array is selected and read. It will be appreciated that, given the number N of tag address bits, any number of tag address bits from 1 to N−1 may be selected to form a subset of tag address bits. Therefore, any number of tag address bits from 1 to N−1 may be compared at one time. A corresponding number of bits of the memory address are then selected. Then, at box 320, the first subset of tag address bits is compared with the respective subset of memory address bits. If the first subsets of the addresses do not match, it is made obvious that the entire tag addresses will not match. Therefore, a "miss" signal will be sent to box 350, where the read operation from the cache memory is canceled. All other cache reads and compares are eliminated at this point, thus, conserving power in the cache memory.

If the first address subsets match, then a second subset of the tag address bits is compared at box 330 with a second subset of memory address bits. The read operation will be canceled at box 350 if the second subsets do not match. However, if the second tag comparison results in a "hit", the tag addresses are further compared until all the address bits are compared. As such, if the last comparison performed at box 335 results in a "hit", then the data is in the cache and the cache read operation is continued at box 340.

Thus, the partial tag comparison allows early determination of a tag mismatch and it minimizes reads and compares of an entire tag address, therefore conserving power in the cache. As stated above, the amount of power that may be saved depends on cache size, block size, hit rate, number of sets in a set-associative cache, and number of bits that are read and compared at one time. For example, a simulation was performed on a 4 way-associative instruction cache that has an address space of $2^{32}$, and a block size of 2K. Assuming a 100% hit rate and using the partial tag comparison method by comparing one half of the tag address at a time, a power saving of approximately 37.5% was accomplished in the cache memory. It will be appreciated that increasing the set-associativity will substantially further increase the amount of power saved.

It will be appreciated that the partial tag comparison method may be used in conjunction with the validity check or parity check embodiments illustrated in FIG. 2. Using these three embodiments together will reduce the power dissipated during cache memory operations considerably. The amount of power saved varies depending on how many of these embodiments are used in conjunction with each other. However, these embodiments do not necessarily have to be combined to accomplish a low power cache memory operation. Any of these three embodiments, used separately from each other, provide a low power cache memory.

Figure 4:
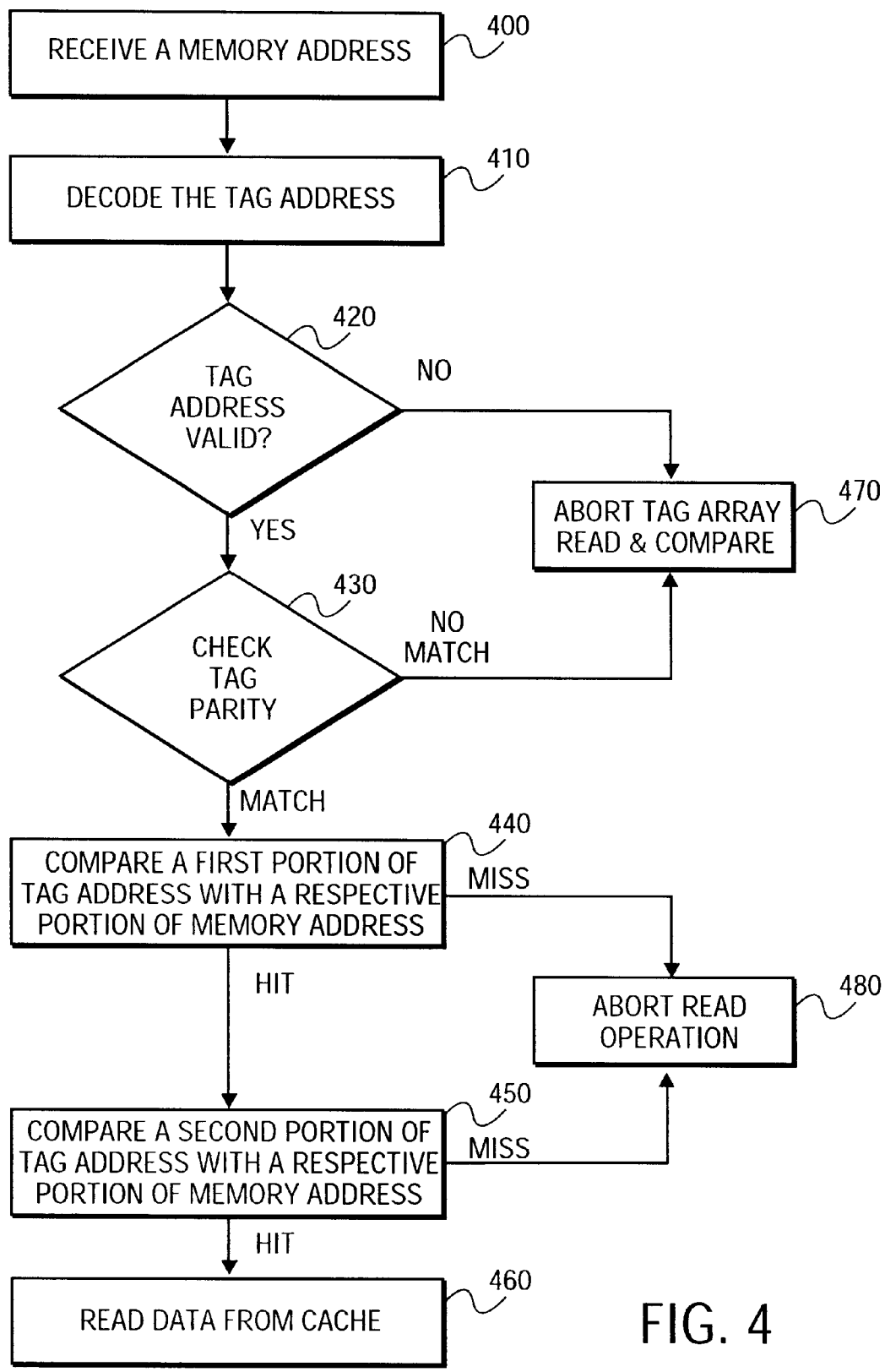
FIG. 4 is a flow chart illustrating a cache read operation according to yet another embodiment of the present invention.

FIG. 4 illustrates another embodiment of the present invention where all three power saving methods are used in a cache memory. In FIG. 4, boxes 400, 410, 420, 430, and 470 are similar to boxes 200, 210, 220, 230, and 260, respectively, of FIG. 2. As such, after a memory address is received and a tag address is decoded, the validity of the tag address is checked at box 420. If the tag is valid, the parity of the tag address is checked at box 430. If either the tag is invalid or the parity does not check, the tag array will not be read or compared, as illustrated at box 470.

If, however, the tag passes both the validity and the parity checks, the tag is read and a first comparison according to the partial tag comparison embodiment of FIG. 3 is initiated. For example purposes, it is assumed the tag address bits are separated into two subsets, a first subset and a second subset. The first subset of the tag address is first compared with a respective subset of the memory address. If a cache "hit" occurs, the second subset of the tag address is compared with a respective subset of the memory address. If both the first and second subsets of the addresses match, it is determined that the data is in the cache. At box 460, the data is read from the data array of the cache memory. If either the first comparison of box 440 or the second comparison of box 450 results in a cache "miss", the processor aborts the read operation from the cache memory at box 480, and the main memory is accessed to retrieve the data.

It will be appreciated that the various embodiments described herein may be utilized with either a set-associative cache or a direct-mapped cache.

Figure 5:
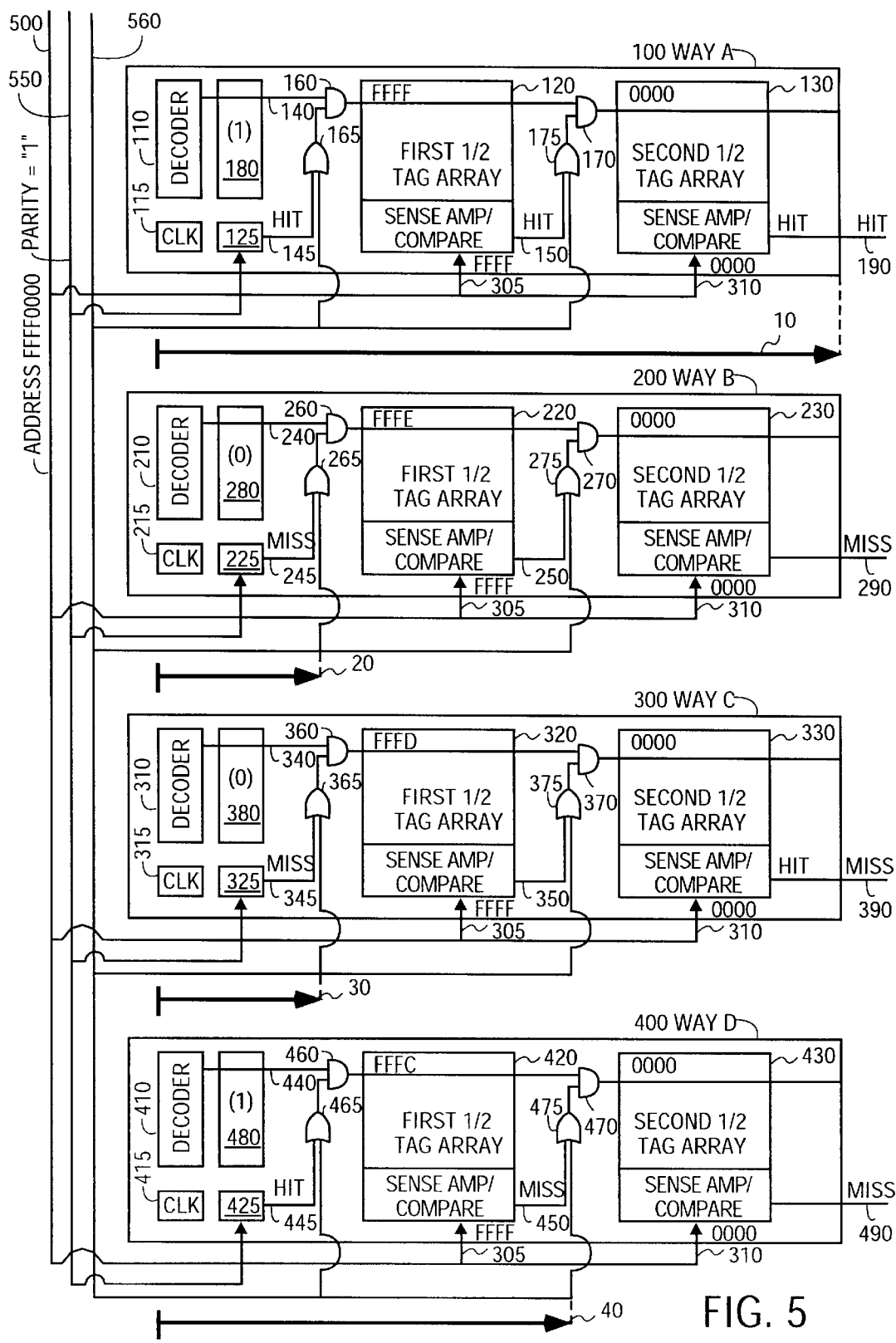
FIG. 5 is a block diagram of a four-way set-associative cache performing the read operation of the embodiment illustrated in FIG. 4.

FIG. 5 illustrates a 4-way set-associative cache memory incorporating the embodiment of FIG. 4. It should be noted that, in order to better illustrate the embodiment of FIG. 4, FIG. 5 illustrates an actual example of a cache memory read operation, where the tag addresses are represented by numerical values for example purposes.

The four ways of the cache memory are Way A 100, Way B 200, Way C 300, and Way D 400. The address 500 represents the incoming tag address and, for example, it has the assumed value of "FFFF0000". The associated parity of the incoming address is represented by line 550. The parity of the address 500 is odd, therefore, line 550 carries the value of "1". Line 560 represents the low power mode bit that may be set as desired to place the cache memory in a low power mode.

It should be noted that, by serially comparing the tag address bits, the speed performance of the cache memory might be reduced. Therefore, using the partial tag comparison method as described above, may result in a trade-off between power consumption and speed performance. The low power mode bit may toggle the cache memory between performing a typical read, i.e. higher speed performance, or the low power read operation according to the various embodiments of the present invention.

Timelines 10, 20, 30, and 40 represent the critical path or read path for each way of the cache memory. The read paths reflect the start and the end of the read operation for each way. As such, all read paths 10, 20, 30, and 40 start with the tag decoding operation.

Using the index bits of the memory address, the tag addresses are decoded for all four ways using decoders 110, 210, 310, and 410. As such, Way A 100 contains, for example, a tag address "FFFF0000", Way B 200 contains a tag address "FFFF0000", Way C 300 contains a tag address "FFFD0000", while Way D 400 contains a tag address "FFFC0000". These tag addresses are however not read until the wordlines 140, 240, 340, and 440 are enabled. The wordlines are enabled by the AND gates 160, 260, 360, and 460.

The storage elements 180, 280, 380, and 480 contain the parity bit(s) generated for each decoded tag address. As such, storage elements 180 and 480 contain an odd parity, while storage elements contain an even parity. Assuming that all the tag addresses are determined to be valid, the parity bits are compared before the wordlines 140, 240, 340, and 440 are enabled. Comparators 125, 225, 325, and 425 compare the parity bit 550 with the parity associated with each tag. The parity comparisons result in signals indicative of a "miss" or a "hit". The parity comparisons will result in two parity "hit" signals, 145 and 445, associated with Way A and Way D, respectively, and two parity "miss" signals, 245 and 335, associated with Way B and Way C, respectively.

Therefore, using the parity bit comparison, it is determined, before reading and comparing the actual tags, that Way B and Way C will not match the incoming address 500. At this point the read operations corresponding to Way B and Way C are canceled, and the read operation will only continue for Way A and Way D. The read paths 20 and 30 corresponding to Way B and Way C, respectively, reflect that no additional operations, such as tag reads or compares are performed from this point on for Way B and Way C.

The parity comparison signals 145 and 445 are then inputs to OR gates 165 and 465, respectively. The low power mode bit 560 is also an input to the OR gates 165 and 465. The output of gates 165 and 465 are AND-ed using gates 160 and 460 with the wordlines enable signals 140 and 440, respectively. As such, the wordlines corresponding to Way A and Way D are enabled.

According to one embodiment of the present invention, the tag arrays are organized in the first half tag array and the second half tag array. As such, Way A is organized in tag arrays 120 and 130, while Way D is organized in tag arrays 420 and 430. After the wordlines 140 and 440 are enabled, the first half of the tags 120 and 420 are read and then each compared with the respective portion 305 of the incoming address 500. The tag comparisons result in a signal indicative of a match between the tags. Signal 150 indicates a "hit", while signal 450 indicates a "miss". Therefore, since the tag 450 did not match, Way D will not continue the cache read operation, which is illustrated by the read path 40.

The "hit" signal 150 is then OR-ed with the low power mode bit 560 using gate 175, and the result of this operation is then AND-ed, using gate 170, with the wordline enable for the second half of the tag array 130 of Way A. The second half of the tag is read and then compared with the second portion 310 of the incoming address 500. The result of this comparison is represented by signal 190 which will indicate a "hit". Therefore, Way A contains the stored tag address that matches the incoming address. Signals 290, 390, and 490 indicate a cache "miss" for all the other ways B, C, and D of the cache memory.

The example illustrated above with reference to FIG. 5, shows how the power consumption in a 4 way set-associative cache memory may be reduced using parity bit comparisons before reading and comparing the tag address. Power consumption is greatly reduced by reading and comparing only half of the tag arrays at one time, thus reducing the number of tag read and compare operations. For example, according to the example illustrated above, only three tag comparisons are performed, compared with eight tag comparisons that would have been performed using prior art methods. The read path 10 illustrates how a full read operation is performed only on Way A, while read paths 20, 30, and 40 illustrate the read operation being canceled at various times during the read operation for all the other ways of the cache memory.

It should be noted that the block diagram of FIG. 5 is not limited to the logic and circuit elements as illustrated. As such, other elements such as: timers, logic gates, etc., may be present without departing from the scope of the invention.

Thus, various embodiments that allow for a low power cache memory have been described. The parity and tag valid verification may be performed before the tag address bits are read and compared, to find a cache "miss" at an earlier stage in a cache memory read operation. The partial tag comparison may be used to minimize the number of tag bits comparisons in a cache memory. The partial tag comparison embodiments compare a selected subset of tag bits at one time and thus, a cache "miss" may be detected without reading or comparing all the tag bits. Therefore, power is saved in the cache memory. Although certain specific embodiments have been described, various modifications and changes to the disclosed embodiments will be apparent to one of ordinary skill in the art upon reading this disclosure. Therefore, it is to be understood that the specification and drawings are merely illustrative of and not restrictive on the broad invention, and that this invention is not limited to the specific embodiments shown and described.

What is claimed is:

1. A method for conserving power during a cache memory operation, the method comprising:
    receiving a memory address comprising a tag field;
    accessing a tag address within the cache memory;
    selecting the tag address bits in a plurality of tag subsets within the tag address;
    comparing a first tag subset of the plurality of tag subsets with a respective first subset of the-tag field of the memory address bits and outputting a first compare signal indicative of the result of the first comparison; and
    interrupting the cache memory operation if the first compare signal indicates the first tag subset does not match the respective first subset of the tag field of the memory address.

2. The method of claim 1 further comprising:
    comparing a second tag subset of the plurality of tag subsets with a respective second subset of tag field of the memory address bits and outputting a second compare signal indicative of the result of the second comparison, wherein the comparing the second tag subset with the respective second subset tag field of the memory address bits is performed if the first compare signal indicates the first tag subset matches the respective first subset of tag field of the memory address.

3. The method of claim 1, wherein the cache memory is a set-associative cache.

4. The method of claim 1 further comprising:
verifying a tag valid bit associated with the tag address, wherein the verifying the tag valid bit is performed before the first comparison.

5. The method of claim 4 further comprising:
interrupting the cache memory operation if the tag address is invalid, wherein the interrupting is performed before the first comparison.

6. The method of claim 1 further comprising:
generating a parity bit corresponding to the tag field of the memory address.

7. The method of claim 6 further comprising:
compare a tag parity bit corresponding to the tag address with the generated parity bit of the tag field of the memory address, wherein the comparing the tag parity bit is performed before the first comparison.

8. The method of claim 7 further comprising:
interrupting the cache memory operation if the tag parity bit does not match the generated parity bit, wherein the interrupting is performed before the first comparison.

9. A method for conserving power during a cache memory operation, the method comprising:
receiving a memory address comprising a tag field;
accessing a tag address within the cache memory;
verifying a tag valid bit associated with the tag address and interrupting the cache memory operation if the tag address is invalid, wherein the interrupting the cache memory operation comprises canceling a tag read operation;
selecting the tag address bits in a plurality of tag subsets within the tag address;
comparing a first tag subset of the plurality of tag subsets with a respective first subset of the tag field of the memory address bits and outputting a first compare signal indicative of the result of the first comparison; and
interrupting the cache memory operation if the first compare signal indicates the first tag subset does not match the respective first subset of the tag field of the memory address.

10. The method of claim 9 further comprising:
comparing a second tag subset of the plurality of tag subsets with a respective second subset of tag field of the memory address bits and outputting a second compare signal indicative of the result of the second comparison, wherein the comparing the second tag subset with the respective second subset tag field of the memory address bits is performed if the first compare signal indicates the first tag subset matches the respective first subset of tag field of the memory address.

11. The method of claim 9, wherein the cache memory is a set-associative cache.

12. The method of claim 9 further comprising:
generating a parity bit corresponding to the tag field of the memory address.

13. The method of claim 12 further comprising:
compare a tag parity bit corresponding to the tag address with the generated parity bit of the tag field of the memory address, wherein the comparing the tag parity bit is performed before the first comparison.

14. The method of claim 13 further comprising:
interrupting the cache memory operation if the tag parity bit does not match the generated parity bit, wherein the interrupting is performed before the first comparison.

15. A method for conserving power during a cache memory operation, the method comprising:
receiving a memory address comprising a tag field;
accessing a tag address within the cache memory;
generating a parity bit corresponding to the tag field of the memory address;
comparing a tag parity bit corresponding to the tag address with the generated parity bit of the tag field of the memory address and interrupting the cache memory operation if the tag parity bit does not match the generated parity bit, wherein the interrupting the cache memory operation comprises canceling a tag address read operation;
selecting the tag address bits in a plurality of tag subsets within the tag address;
comparing a first tag subset of the plurality of tag subsets with a respective first subset of the tag field of the memory address bits and outputting a first compare signal indicative of the result of the first comparison; and
interrupting the cache memory operation if the first compare signal indicates the first tag subset does not match the respective first subset of the tag field of the memory address.

16. The method of claim 15 further comprising:
comparing a second tag subset of the plurality of tag subsets with a respective second subset of tag field of the memory address bits and outputting a second compare signal indicative of the result of the second comparison, wherein the comparing the second tag subset with the respective second subset tag field of the memory address bits is performed if the first compare signal indicates the first tag subset matches the respective first subset of tag field of the memory address.

17. The method of claim 15, wherein the cache memory is a set-associative cache.

18. The method of claim 15 further comprising:
verifying a tag valid bit associated with the tag address, wherein the verifying the tag valid bit is performed before the first comparison.

19. The method of claim 18 further comprising:
interrupting the cache memory operation if the tag address is invalid, wherein the interrupting is performed before the first comparison.

20. A method for conserving power during a cache memory operation, the method comprising:
receiving a memory address comprising a tag field;
accessing a tag address within the cache memory;
generating a parity bit corresponding to the tag field of the memory address;
comparing a tag parity bit corresponding to the tag address with the generated parity bit of the tag field of the memory address; and
interrupting the cache memory operation if the tag parity bit does not match the generated parity bit, wherein the interrupting is performed before the tag address is compared with the tag field of the memory address.

21. The method of claim 20 further comprising:

selecting the tag address bits in a plurality of tag subsets;

comparing a first tag subset of the plurality of tag subsets with a respective first subset of the tag field of the memory address bits and outputting a first compare signal indicative of the result of the first comparison; and interrupting the cache memory operation if the first compare signal indicates the first tag subset does not match the respective first subset of the tag field of the memory address.

22. The method of claim 21 further comprising:

comparing a second tag subset of the plurality of tag subsets with a respective second subset of tag field of the memory address bits and outputting a second compare signal indicative of the result of the second comparison, wherein the comparing the second tag subset with the respective second subset tag field of the memory address bits is performed if the first compare signal indicates the first tag subset matches the respective first subset of tag field of the memory address.

23. The method of claim 20, wherein the cache memory is a set-associative cache.

24. The method of claim 20 further comprising:

verifying a tag valid bit associated with the tag address, wherein the verifying the tag valid bit is performed before the comparing the first tag subset.

25. The method of claim 24 further comprising:

interrupting the cache memory operation if the tag address is invalid, wherein the interrupting is performed before the comparing the first tag subset.

26. A cache circuit for reducing the power during a cache memory operation, the cache circuit comprising:

a memory address means for providing a memory address having a plurality of fields including a tag field;

a decoder for selecting a tag address within the cache memory;

a parity bit generator for generating a parity bit corresponding to the tag field;

a first comparator for comparing the generated parity bit of the tag field with a parity bit corresponding to the tag address; and a plurality of comparators coupled to the first comparator for serially comparing subsets of the tag address with subsets of tag fields of the memory address;

wherein the serial comparison of the subsets of the tag address with the subsets of the tag field is performed after the first comparison of generated parity bit with the tag address parity bit, and wherein the serial comparison is performed if the generated parity bit matches the tag address parity bit.

27. The apparatus of claim 26, wherein the cache memory is a set-associative cache.

* * * * *